Figure 1:
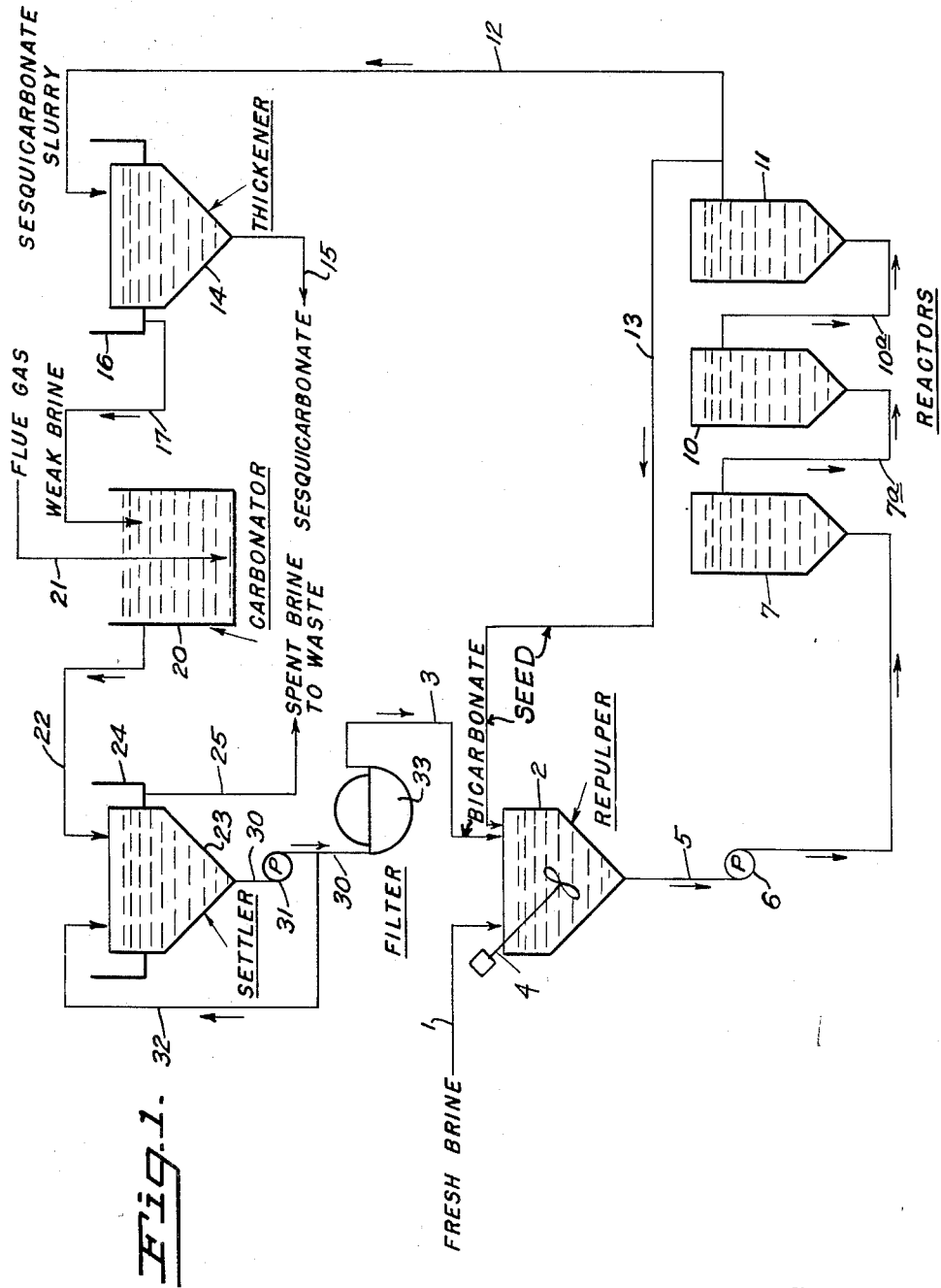

Patented Jan. 27, 1953

2,626,852

UNITED STATES PATENT OFFICE 2,626,852

PRODUCTION OF SODIUM SESQUICARBONATE FROM A BRINE CONTAINING A SUBSTANTIAL SODIUM CARBONATE CONTENT

Alva C. Byrns, Concord, Calif., assignor to Kaiser Aluminum & Chemical Corporation, a corporation of Delaware Application April 6, 1949, Serial No. 85,763

8 Claims. (Cl. 23—64)

This invention relates to a method of recovering sodium sequicarbonate from brines containing sodium carbonate.

There are available in certain regions, such as at Owens Lake and Searles Lake in California, natural brines containing, among other salts, sodium carbonate and sodium bicarbonate. The first attempts to recover sodium carbonate from these brines involved treating the brines with carbon dioxide to precipitate the less soluble sodium bicarbonate, in accordance with the chemical reaction, (2) $3Na_2CO_3 + CO_2 + 3H_2O =$
$2Na_2CO_3.NaHCO_3.2H_2O$ These attempts were unsuccessful, or fell into disuse because of the high consumption of carbon dioxide (one mol per mol of sodium carbonate treated), the consequent necessity of using gases relatively rich in carbon dioxide (such as gases from calcination of limestone or dolomite) and the finely divided character of the precipitate, which made settling and filtering difficult.

Quite some time again a different method was adopted upon which a considerable industry was based and continues to operate. This method carbonates the brine only to the extent of producing sodium sesquicarbonate or trona in accordance with the reaction (2) $3Na_2CO_3 + CO_2 + 3H_2O =$
$2Na_2CO_3.NaHCO_3.2H_2O$ The sodium sesquicarbonate, $Na_2CO_3.NaHCO_3.2H_2O$ is relatively insoluble in the presence of other salts, such as sodium chloride, normally present in such brines. The sesquicarbonate, therefore, precipitates from the brine. It is salable as such or may be converted to sodium carbonate or sodium bicarbonate by methods well known in the art.

This latter method is advantageous in that it consumes less carbon dioxide, allows the use of more dilute $CO_2$-containing gases, such as boiler flue gas, and produces larger crystals which can be more readily thickened, filtered and washed. This method has, however, several disadvantages. Thus, it is better adapted to batch operation than to continuous operation. Also, the method is wasteful of brine values and, in practice, is economical only when rich brines are available, for the following reasons. As a brine is carbonated its alkalinity is reduced. When the total alkalinity reaches a certain value, usually from 6 to 8% depending upon the chloride content of the brine, an equilibrium between sodium bicarbonate and sodium sesquicarbonate is reached. Further carbonation causes formation of bicarbonate, perhaps by redissolution of sesquicarbonate. Whatever the mechanism involved, the practical significance of this phenomenon is that further carbonation entails unduly large consumption of carbon dioxide to form sodium bicarbonate by Reaction 1, and the crystalline product is more difficult to filter and settle. As a result, the aforementioned method of carbonating natural brines to precipitate sodium sesquicarbonate is limited to rich brines (which are of decreasing availability or involve expensive construction and maintenance of evaporation ponds) and it fails to recover a large portion of the available soda value.

For further details regarding the carbonation of natural brines to produce sodium sesquicarbonate, reference is made to an article by P. T. Dolley in Industrial and Engineering Chemistry, vol. 29, pp. 1101–1106 (1937), entitled "Absolute Crystallization Rate of Sodium Sesquicarbonate." Particular reference is made to the curves of Fig. 2 thereof, showing that the rate of crystallization drops off to zero at about 6 to 8% total alkalinity, depending upon the chloride content of the brine. Early patents, including U. S. 1,184,806 to Wrinkle, 1,319,128 to Watson and Hirschkind, and 399,176 to Watts and Richards, related to various methods of carbonating brines to obtain sesquicarbonate or trona; but all of these patented processes required increased temperatures of operation, that is, 35° C. or above, and had the added disadvantages that a considerable amount of alkalinity is not recovered because the spent brine, that is, after the first precipitation of sesquicarbonate, is sent to waste; and also that, in some, the bicarbonate is made by carbonating the starting brine, and carbonation of brines of such high alkalinity results in bicarbonate of rather gelatinous consistency or very poor crystalline form, difficult to settle and filter, and with the further disadvantage that the total alkalinity can be reduced by precipitation of sesquicarbonate only to the aforesaid 6 to 8%, so that considerable alkaline values are not recoverable.

It is an object of the present invention to provide an improved method of obtaining soda values from brines of sodium carbonate. It is another object of the invention to provide an improved method of obtaining sodium sesquicarbonate from sodium carbonate brines, such as the natural brines of Owens Lake. It is a further object of the invention to provide a method whereby sodium sesquicarbonate can be obtained in high yield and with minimum consumption of carbon dioxide.

It is a further particular object of the invention to provide a method whereby a good yield of sodium sesquicarbonate can be obtained from relatively dilute brines, e. g., containing 10 to 13% sodium carbonate, without incurring high consumption of carbon dioxide and without production of crops of finely divided crystals which are difficult to settle and filter.

These and other objects of the invention will be apparent from the following description and the appended claims.

I have discovered that sodium sesquicarbonate can be economically produced from brines of sodium carbonate in a continuous manner and without several of the disadvantages of prior methods, by a stage-wise process as follows: Fresh brine is treated with sodium bicarbonate to precipitate sodium sesquicarbonate, this treatment preferably being carried to a point such that the alkalinity of the brine is so reduced that in the next stage, no sodium sesquicarbonate is precipitated. In this next stage, after separation of the precipitated sodium sesquicarbonate, the mother liquor or partly spent brine is treated with carbon dioxide to precipitate sodium bicarbonate. The precipitated sodium bicarbonate is separated, and, after dewatering to any desired extent, is recycled to treat further quantities of fresh brine.

By this method, several of the disadvantages of the prior method, wherein fresh brine is carbonated directly, are avoided or diminished. Thus, retention time is shorter and the process is more easily carried out in a continuous manner, more dilute brines can be used and higher yields based on brine and carbon dioxide are obtainable. The precipitation of sodium bicarbonate in the second step of the process, since it is carried out at an alkalinity which favors formation of the bicarbonate rather than sodium sesquicarbonate, produces a precipitate which is crystalline or is generally more easily handled in the further steps of the process, whereas carbonation of the fresh brine results in a quite gelatinous precipitate difficult and wasteful to recover and also requires more consumption of carbon dioxide. The crystals of sodium bicarbonate formed according to the present process react surprisingly rapidly with fresh brine to precipitate sodium sesquicarbonate.

Conditions leading to rapid reaction are conditions favoring rapid dissolution; however, when the reaction is near completion it is not necessary to use as high a rate of mixing and there may be advantages in carrying the reaction out in two stages.

By this cyclic method, surprisingly good results are obtained. Thus, I have found that the bicarbonate formed in the second step reacts with unexpected rapidity with the fresh brine to precipitate sodium sesquicarbonate. The sesquicarbonate so formed, usually substantially free of bicarbonate, is composed of well-formed crystals which are easily settled and filtered. Also great economy is effected because the "spent brine" from the sesquicarbonate precipitation may then be carbonated with carbon dioxide or any suitable carbon dioxide-containing gas such as boiler flue gas or flue gases of higher concentration $CO_2$ obtained by calcining sesquicarbonate in an externally fired system, or lime kiln gas to reduce the alkalinity to a low value, e. g.,  2 to 4%. If, in this carbonation step, the sodium bicarbonate is somewhat gelatinous or difficult to settle and filter, the same is not of as much significance as in the precipitation of the sesquicarbonate, for it is necessary only partially to dewater the bicarbonate slurry, to an extent sufficient to avoid undue build-up of liquid volume in the system. Further, if, as in the preferred practice of the invention, the treatment of fresh brine with bicarbonate in the first stage of the process is carried to the point where little or no further sesquicarbonate is precipitated, that is, to approximately the equilibrium point between sodium sesquicarbonate and sodium bicarbonate, then in the second stage, the carbonation step, the precipitate of bicarbonate is well-formed and easily settled and filtered. It is believed that when brines having higher total alkalinities than that of the sesquicarbonate equilibrium point for each are carbonated, sodium sesquicarbonate forms first, and then the sodium carbonate constituent thereof re-dissolves, leaving the sodium bicarbonate constituent undissolved. The latter is then in a rather gelatinous, or "slimy," state and is difficult and wasteful to settle and filter. These disadvantages are avoided in the present process where carbonation is practiced on brines which have already been reduced in alkalinity by removal of the sesquicarbonate, and the state of the brine favors precipitation of sodium bicarbonate in satisfactory crystalline form.

Figure 2:
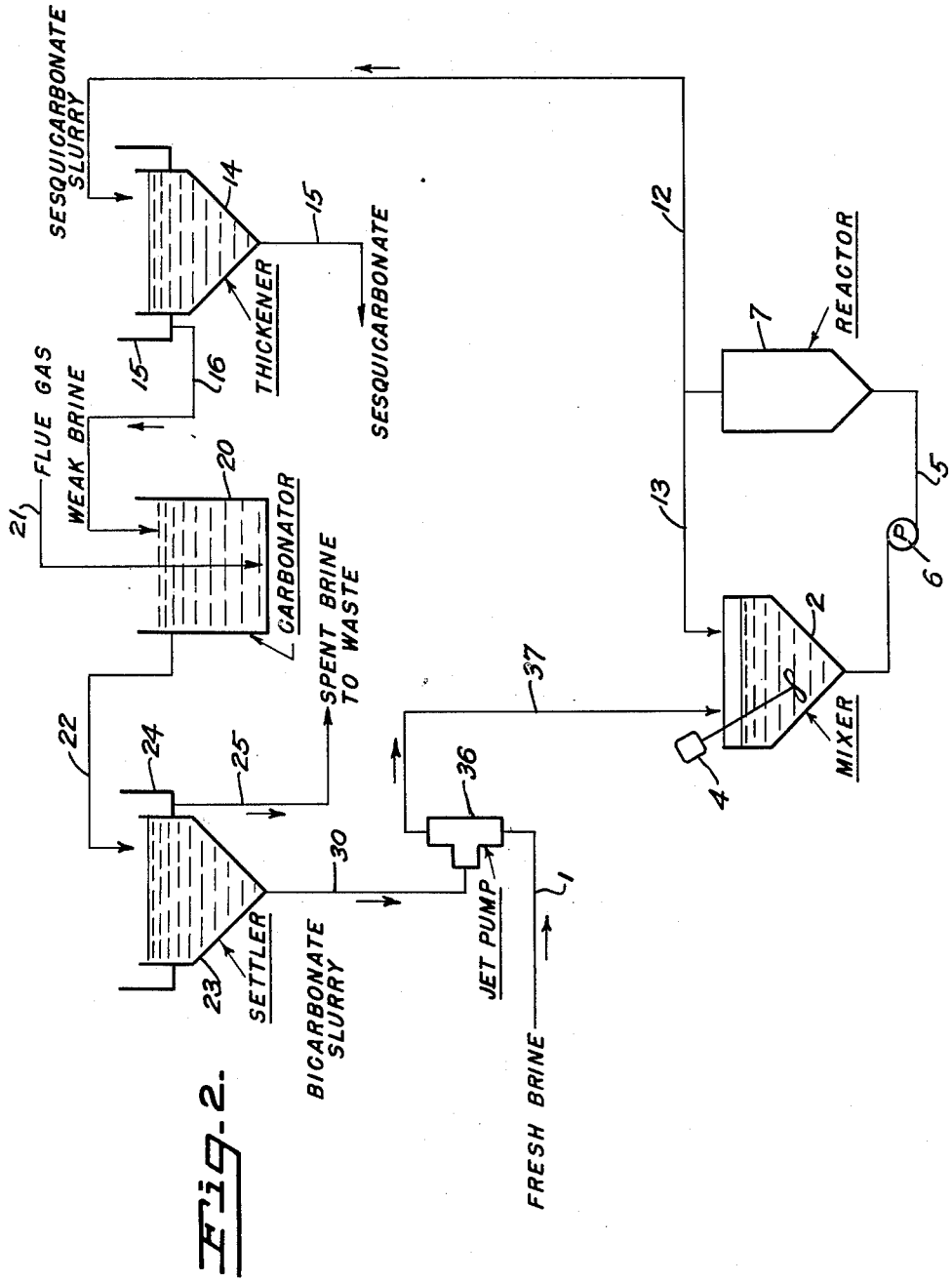

The invention will be better understood by reference to the accompanying drawings in which, Fig. 1 is a diagrammatic flowsheet of one embodiment of the invention, in which fresh brine, after mixing with sodium bicarbonate, is passed through a series of reactors; and Fig. 2 is a diagrammatic flowsheet of another embodiment of the invention in which a single reactor is used and certain other modifications are employed.

Figure 3:
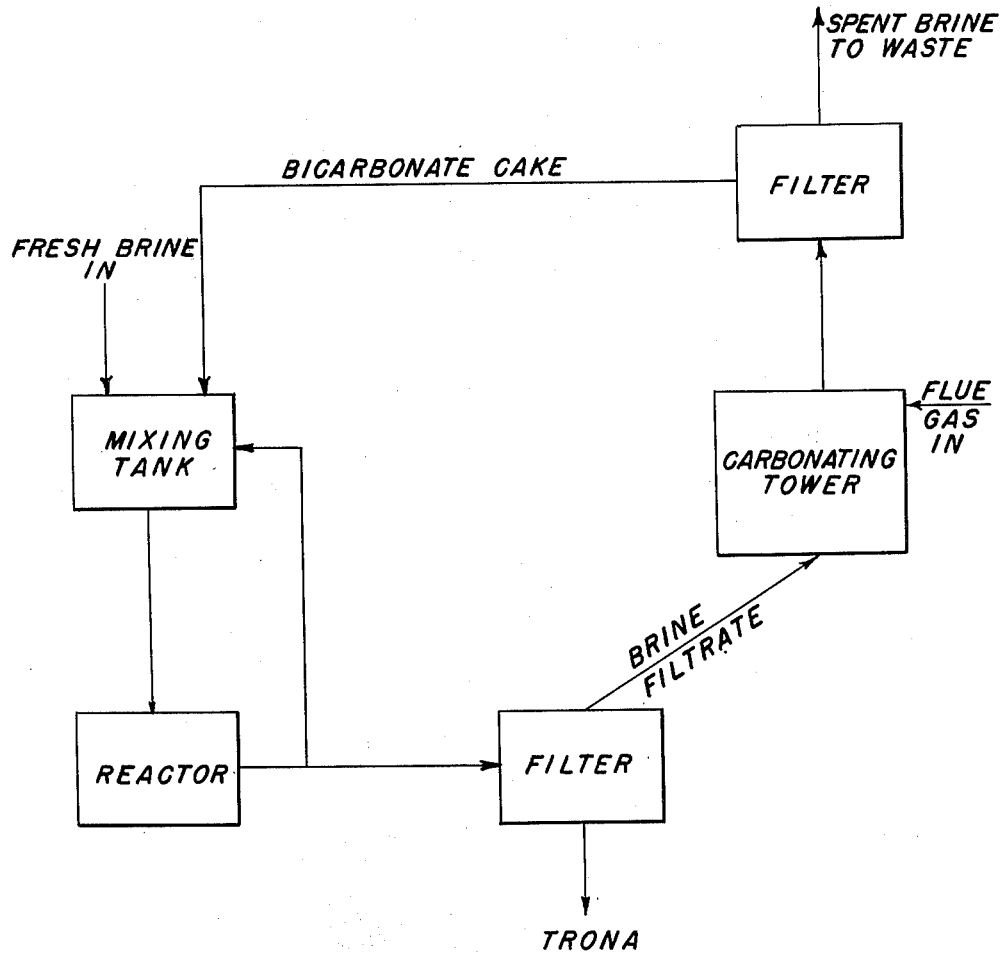

Fig. 3 is a flowsheet of still another embodiment of the invention in which other modifications are practiced.

Referring now to Fig. 1 of the drawings, fresh brine enters the system through line 1 from a suitable source (not shown), such as tanks or ponds or directly from a lake or well. It is mixed in repulper or mixer 2 with a paste of sodium bicarbonate entering through line 3, the source of bicarbonate being explained herein below. Repulper 2 is provided with an agitator 4. The resulting slurry, which will have undergone considerable reaction in the repulper to precipitate sodium sesquicarbonate, is pumped from repulper 2 through line 5 by pump 6 to the first of three reactors 7, 10, and 11. From reactor 7 the partly reacted slurry is transferred by gravity or by a pump (not shown) through line 7a to second reactor 10, thence through line 10a to the third reactor 11. These reactors may be of any convenient size and design, being shown as conebottom tanks which may be provided internally with baffles or agitating mechanism (not shown) to secure intimate contact and sufficiently long residence time to complete the reaction. Reacted slurry is removed from reactor 11 through line 12, a part thereof being diverted through line 13 and recycled to repulper 2 and the reactor system as shown.

Reacted slurry, now consisting of a solid phase of sodium sesquicarbonate crystals and a liquid phase or mother liquor of low alkalinity, is settled or thickened in conebottom thickener 14.

Settled crystals of sesquicarbonate, the end product of the system, are withdrawn through line 15 for further processing, such as filtering and calcination to soda ash. Where the withdrawn, thickened crystal sludge is filtered, the filtrate therefrom is advantageously also returned to the carbonating zone, and appreciable alkalinity thereby recovered.

The mother liquor or weak brine is withdrawn through launder 16 and line 17 and is introduced into carbonator 20, where it is carbonated by flue gas entering through line 21. Carbonator 20 is shown, for simplicity, as an open tank, with the flue gas reactant introduced near the bottom. The flue gas bubbles to the top and in so doing is stripped of part of its carbon dioxide to react with sodium carbonate. Suitable means (not shown), which are well known in the art, such as a perforated delivery pipe, baffles and even bubble trays may be employed to promote contact, and the carbonator may be closed and pressure exerted to increase the partial pressure of carbon dioxide.

From carbonator 20 the resultant slurry of sodium bicarbonate crystals and mother liquor or spent brine is passed through line 22 to cone-bottom settler 23, where the crystals are settled out and the spent brine is removed from the system to waste through launder 24 and line 25.

A concentrated slurry of crystals and spent brine is pumped from the bottom of thickener 23 through line 30 by pump 31 to vacuum filter 33 of the drum-vacuum type. Part of the slurry is recycled to settler 23 through line 32. A paste of sodium bicarbonate is removed from filter 33 by means (not shown) well-known to the art, such as a doctor knife, and is passed through line 3 to repulper 2, where it reacts with a further quantity of fresh brine.

Referring now to Fig. 2, in which identical parts are identically numbered, much of the operation is similar and requires no repetition. The embodiment illustrated by this figure is simpler in that it eliminates the use of a filter and employs a single reactor. The fresh brine introduced through line 1 and the concentrated slurry of bicarbonate crystals coming from settler 23 through line 30, are mixed directly in jet pump 36, and are mixed therein and pumped through line 37 to mixer 2 for further mixing. Thence, the pulp or mixture is pumped through line 5 by pump 6 to single reactor 7. The effluent from reactor 7, being a slurry of sodium sesquicarbonate crystals and weak brine, is conveyed through line 12 to thickener 14, a part thereof being diverted through line 13 for recycling to mixer 2.

It will be understood, of course, that valves, pumps and/or gravity system will be employed to control and effect the flow of fluids and solids in the system.

The method of the invention may be applied to batch or continuous practice but is more advantageously applied to continuous practice. It is preferably applied to a natural brine, such as Owens Lake brines, having total alkalinities (reckoned as $Na_2CO_3$) of 10% or more, and containing other salts such as sodium chloride, potassium chloride, sodium borates, sodium sulfate, etc. Typical natural brines are those described in the aforementioned Dolley article and in the specific examples herein below. However, the method is applicable to other natural brines, and to artificial brines or relatively pure sodium carbonate solutions. An example of the latter is the relatively pure sodium carbonate solution resulting from the production of chromic oxide by roasting sodium chromate with carbon. The roasted product is leached with water to remove the sodium carbonate from the chromic acid, thus producing, as a by-product, an aqueous solution of sodium carbonate. This aqueous solution may be treated by the method of the invention to recover sodium sesquicarbonate.

The following specific examples will serve further to illustrate the practice and advantages of the invention.

*Example 1.*—The procedure of this example illustrates the applicability of the process of the invention to utilization of any partly spent brine. Apparatus of the type shown in Fig. 1 was used. Partly spent or weak brine of 7.5% total alkalinity, derived from a conventional carbonation treatment of fresh brine to precipitate sodium sesquicarbonate, was used. The fresh brine from which this weak brine was derived, also the fresh brine introduced into the process of the invention as described below (i. e., introduced into repulper 2), had the following analysis:

*Fresh brine analysis*

| Average composition of 13% brine: | Percent |
|---|---|
| Total alkalinity as $Na_2CO_3$ | 13.0 |
| Total chloride as NaCl | 15.5 |
| Borax as $Na_2B_4O_7 10H_2O$ | 2.0 |
| $SO_4$ as $Na_2SO_4$ | 4.0 |
| Bicarbonate as $NaHCO_3$ | 0.4 |

For convenience, reference is made to the equipment of Fig. 1.

The aforementioned weak brine and flue gas containing 14% $CO_2$ were introduced into carbonator 20 and were mixed therein. Carbonation was carried out continuously, the flue gas being continuously introduced near the bottom of the carbonator and the carbonated slurry being continuously removed near the top. Carbonation was carried out to a sufficient extent to reduce the total alkalinity of the brine to 3%. The resulting precipitate of sodium bicarbonate was separated in a cone-bottom settler 23 and the resulting concentrated slurry of bicarbonate was filtered to produce a paste on a drum-vacuum type filter 33.

The bicarbonate paste so formed was mixed with fresh brine in repulper 2, in the proportions of 2 lbs. bicarbonate paste containing 80% $NaHCO_3$ and 1 to 1.5 gallons of brine. The resulting slurry was pumped in series through three reactors 7, 10, and 11 provided with propeller type mixers for promoting agitation. Temperature of the fresh brine feed was varied from 90 to 120° F., averaging 103° F. A sufficient amount of reaction mixture from the last reactor was recycled to the first reactor, to prevent plugging of the lines by solid sesquicarbonate. Temperature of the brine leaving the last reactor was 89.1° F. and its total alkalinity was 8%.

The unrecycled portion of slurry from the last reactor was treated in a thickener 14 to produce a concentrated slurry of sodium sesquicarbonate crystals and a mother liquor of weak brine suitable for carbonating, etc., in the same manner as the weak brine originally treated. Analysis of the sesquicarbonate was as follows:

*Sesquicarbonate analysis*

| Filter cake: | Percent |
|---|---|
| $NaHCO_3$ | 0.41 |
| $Na_2CO_3.NaHCO_3.2H_2O$ | 99.0 |
| $Na_2B_4O_7.10H_2O$ | 0.41 |

*Example 2.*—Materials used in the method of this example were a weak brine from previous conventional carbonation of a fresh brine, a fresh brine and flue gas, all of the same compositions as in Example 1. The method shown in Fig. 2 of the drawings was used to treat these materials. That is, proceeding from the carbonation step, weak brine was carbonated with flue gas to produce a slurry of bicarbonate in which the brine had a total alkali content of 3%; this slurry was separated to produce a concentrated slurry containing 15% bicarbonate and an overflow of spent brine; the 15% slurry was mixed directly with fresh brine in a jet pump 36, and was mixed further in mixer 2; the mixture was then passed through a single reactor 7; and part of the reaction mixture was recycled while another part was thickened in cone-bottom thickener 13 to produce a concentrated slurry of sodium sesquicarbonate. This slurry was filtered to produce a filter cake, of which the total alkalinity contained only about 1% sodium bicarbonate and over 98% of sodium sesquicarbonate. The procedure of Example 2 is advantageous in that it avoids difficulties sometimes encountered in filtering the bicarbonate slurry from settler 23.

*Example 3.*—This example illustrates the application of the invention as shown in the flowsheet, Figure 3, utilizing fresh brine feed having the analysis shown in Example 1. The fresh brine feed is introduced into a mixer and is there mixed with bicarbonate filter cake from a previous operation and containing 50% solids, and the cake being added in an amount to react with a portion of the sodium carbonate of the brine to give a resultant solution which approaches the sodium sesquicarbonate equilibrium point of the brine. When fresh brine is flowing in at the rate of 100 gals. (1000 lbs.) per minute, approximately 100 lbs. per minute of the 50% solids cake are added. The bicarbonate cake and the brine are preferably mixed in the mixing tank with a propeller type agitator. The reactants are then pumped through a retention tank to allow further time for completion of the reaction, and then are withdrawn to a filter where the sesquicarbonate, or trona, product is recovered as filter cake. This material contains not over about 1.0% free sodium bicarbonate. A portion of the suspension from the retention tank is pumped back to the mixing tank to provide seed crystals at the start of the reaction, and facilitate formation of larger crystals in the precipitate.

The filtrate has an average total alkalinity of 7.1% and is introduced into a carbonating tower where flue gas is added in such amount that 13.1 lbs. of $CO_2$ are absorbed per 1000 lbs. of initial brine feed. The bicarbonate slurry withdrawn from the bottom of the carbonating tower has a total alkalinity of 3% and a solids content of 5.3%. The slurry is filtered and the filter cake added to incoming fresh brine as shown above, the filtrate, having about 3% total alkalinity, going to waste. Alternatively, the slurry can be thickened and then filtered, or it can be thickened and a thick slurry fed into the incoming fresh brine.

The sesquicarbonate, or trona, filter cake obtained as described in the above examples can be washed, for example on the filter, to remove excess brine, if desired. Also, if high-purity sesquicarbonate is desired, just enough of the bicarbonate as produced in the carbonating tower is added to the incoming fresh brine to bring the system to the sesquicarbonate equilibrium point, i. e. to 6% to 8% total alkalinity; but if purity of the final product is not essential, excess bicarbonate can be added and recovered on the filter with the sesquicarbonate, and the advantages of this invention will still be realized because both materials will be in improved crystalline form and of excellent settling and filtering characteristics. In other operations, where the total alkalinity of the incoming fresh brine may be more than the usual 10% to 13%, it is sometimes advantageous to dilute the brine with the spent brine coming from the carbonating towers, in which case the operator is enabled to reduce the total alkalinity at the end of the sesquicarbonate-forming reaction to the resired equilibrium range more efficiently, although the reaction time may be slowed somewhat. This dilution can be effected, for example, by introducing into the incoming brine, instead of sodium bicarbonate filter cake alone, or a thick slurry thereof, a thinner slurry of the material, for example, as coming from the carbonating tower by way of the settling tank. An easily filterable precipitate of the sesquicarbonate is obtained when operating according to the present process, but when it is desired to increase the crystal size of the precipitate a portion of the suspension from the reactor is recycled to the primary mixer, as shown.

In the specification and claims, the total alkalinity is alkalinity calculated as $Na_2CO_3$, as determined by titrating the solutions to neutrality wtih acid, using methyl orange or a similar indicator. In the specification and claims, percentages are by weight unless otherwise indicated. Having now described the invention, what is claimed is:

1. A cyclic method of recovering soda values from sodium carbonate brine containing a substantial $Na_2CO_3$ content, which comprises reacting a quantity of the brine with sodium bicarbonate to precipitate sodium sesquicarbonate, until the alkalinity of said brine is reduced to a point such that in the next stage substantially no sodium sesquicarbonate is precipitated, separating the precipitate of sodium sesquicarbonate from the mother liquor, treating the mother liquor with carbon dioxide to precipitate sodium bicarbonate, separating sodium bicarbonate from the bulk of the mother liquor and reacting the separated sodium bicarbonate with a further quantity of said brine to precipitate a further quantity of sodium sesquicarbonate.

2. A continuous, cyclic method of producing sodium sesquicarbonate from a sodium carbonate brine, which comprises continuously treating fresh brine containing a substantial $Na_2CO_3$ content with sodium bicarbonate to precipitate sodium sesquicarbonate, said treatment being carried to a point such that the alkalinity of the brine is so reduced that in the next stage no sodium sesquicarbonate is precipitated, separating the precipitated sodium sesquicarbonate, separating and continuously treating the mother liquor so produced with carbon dioxide to precipitate sodium bicarbonate, and separating and continuously recycling the sodium bicarbonate so produced to react with further quantities of fresh brine.

3. The method of claim 2, wherein the fresh brine is a natural brine having a total alkali content above about 8% and the proportions of reactants and residence time in the reaction vessel during the fresh brine-sodium bicarbonate reaction are such as to produce a mother liquor containing about 6 to 8% total alkali content.

4. Method of claim 2 wherein the treatment with carbon dioxide is effected by introduction into the mother liquor of boiler flue gas.

5. A continuous cyclic method of producing sodium sesquicarbonate from a sodium carbonate natural brine having a substantial $Na_2CO_3$ content which comprises continuously treating incoming fresh brine of from about 10% to about 13% total alkalinity with sodium bicarbonate precipitated from a previous operation to precipitate sodium sesquicarbonate and to produce a mother liquor having from 6% to 8% total alkalinity, filtering to separately recover solid sodium sesquicarbonate and mother liquor, introducing carbon dioxide into said mother liquor to produce a suspension of sodium bicarbonate in a spent brine having from 2% to 4% total alkalinity, transferring said suspension to a settling zone, withdrawing to waste clarified spent brine from the upper portion of said settling zone, withdrawing thickened sodium bicarbonate slurry from the lower portion of said settling zone and recycling said thickened slurry to incoming fresh brine.

6. Method as in claim 5 wherein carbon dioxide is introduced in the form of boiler flue gas.

7. A continuous, cycle method of producing sodium sesquicarbonate from a natural sodium carbonate brine which comprises continuously treating incoming fresh brine containing a substantial $Na_2CO_3$ content and of at least 10% total alkalinity with sodium bicarbonate from a previous operation to precipitate sodium sesquicarbonate until the alkalinity of said brine is reduced to a point such that in the next stage no sodium sesquicarbonate is precipitated, filtering to separately recover solid sodium sesquicarbonate and mother liquor, introducing carbon dioxide into said mother liquor to produce a suspension of sodium bicarbonate in spent brine, filtering said suspension to recover solid sodium bicarbonate and recycling said solid bicarbonate to incoming fresh brine.

8. A continuous, cycle method of producing sodium sesquicarbonate from a sodium carbonate brine which comprises continuously vigorously admixing incoming fresh brine containing a substantial $Na_2CO_3$ content with sodium bicarbonate from a previous operation in a mixing zone, withdrawing said admixture to a reaction zone, agitating said admixture in said reaction zone to form a suspension of crystalline sodium sesquicarbonate in a mother liquor carrying out said treatment to a point such that the alkalinity of the brine is so reduced that in the next stage no sesquicarbonate is precipitated withdrawing said suspension and recycling a portion thereof to said mixing zone, filtering the remainder of said suspension to separately recover solid sodium sesquicarbonate and mother liquor, treating said mother liquor to precipitate sodium bicarbonate, separating said sodium bicarbonate from the treated mother liquor, and recycling said sodium bicarbonate to incoming fresh brine.

ALVA C. BYRNS.

REFERENCES CITED

The following references are of record in the file of this patent:

UNITED STATES PATENTS

| Number | Name | Date |
| --- | --- | --- |
| 1,475,563 | Brooks | Nov. 27, 1923 |
| 1,583,662 | Sundstrom et al. | May 4, 1926 |
| 1,748,739 | Sundstrom | Feb. 25, 1930 |
| 1,865,832 | Chesny | July 5, 1932 |
| 1,865,833 | Chesny | July 5, 1932 |
| 1,911,794 | Britton | May 30, 1933 |
| 1,975,449 | Cunningham | Oct. 2, 1934 |
| 2,038,025 | Cunningham | Apr. 21, 1936 |
| 2,369,475 | McGeorge et al. | Feb. 13, 1945 |
| 2,433,601 | Comstock | Dec. 30, 1947 |
| 2,516,987 | Hengerer | Aug. 1, 1950 |

FOREIGN PATENTS

| Number | Country | Date |
| --- | --- | --- |
| 25,082 | Great Britain | 1909 |

OTHER REFERENCES

"The Industrial Development of Searles Lake Brines," by J. E. Teeple, 1929 ed., pages 16–18, published by the Chemical Catalog Co., Inc., N. Y.